(12) United States Patent
Pinckney

(10) Patent No.: US 7,506,901 B2
(45) Date of Patent: Mar. 24, 2009

(54) RESILIENT LOCKING CONNECTION

(76) Inventor: Robert Pinckney, 121 W. Lake Rd., Penn Yan, NY (US) 14527

( * ) Notice: Subject to any disclaimer, the term of this patent is extended or adjusted under 35 U.S.C. 154(b) by 456 days.

(21) Appl. No.: 10/891,399

(22) Filed: Jul. 14, 2004

(65) Prior Publication Data
US 2006/0012173 A1    Jan. 19, 2006

(51) Int. Cl.
F16L 15/00 (2006.01)
F16L 15/06 (2006.01)
F16L 15/08 (2006.01)

(52) U.S. Cl. ........................ 285/390; 411/311
(58) Field of Classification Search ................. 411/311, 411/366.1, 366.3; 285/390, 391
See application file for complete search history.

(56) References Cited

U.S. PATENT DOCUMENTS

| | | | | | |
|---|---|---|---|---|---|
| 2,301,181 | A | * | 11/1942 | Ilsemann | 411/309 |
| 2,788,045 | A | * | 4/1957 | Rosan | 411/277 |
| 2,788,046 | A | * | 4/1957 | Rosan | 411/311 |
| 2,864,629 | A | | 12/1958 | Hall, Sr. | |
| 3,176,746 | A | * | 4/1965 | Walton | 411/259 |
| 3,425,314 | A | | 2/1969 | Ohlson | |
| 3,517,717 | A | * | 6/1970 | Orlomoski | 411/311 |
| 3,721,283 | A | * | 3/1973 | Evans | 411/311 |
| 3,850,215 | A | * | 11/1974 | Orlomoski | 411/311 |
| 3,885,613 | A | * | 5/1975 | Evans | 411/311 |
| 4,252,168 | A | * | 2/1981 | Capuano | 411/311 |
| 4,273,175 | A | * | 6/1981 | Capuano | 411/168 |
| 4,586,861 | A | * | 5/1986 | McKewan | 411/311 |
| 5,282,707 | A | * | 2/1994 | Palm | 411/3 |
| 5,360,240 | A | | 11/1994 | Mott | |
| 5,538,378 | A | | 7/1996 | Van Der Drift | |
| 5,672,037 | A | * | 9/1997 | Iwata | 411/311 |
| 5,944,465 | A | * | 8/1999 | Janitzki | 411/310 |
| 6,102,639 | A | | 8/2000 | DiStasio | |
| 6,149,650 | A | | 11/2000 | Michelson | |
| 6,190,101 | B1 | * | 2/2001 | Janitzki | 411/310 |
| 6,447,227 | B1 | * | 9/2002 | Crutchley | 411/69 |
| 6,474,511 | B1 | | 11/2002 | Antal, Sr. | |
| 6,582,432 | B1 | | 6/2003 | Michelson | |
| 2003/0155768 | A1 | * | 8/2003 | Hollingsworth et al. | 285/333 |

FOREIGN PATENT DOCUMENTS

WO    WO 94/20781    9/1994

* cited by examiner

Primary Examiner—James M Hewitt
(74) Attorney, Agent, or Firm—Hiscock & Barclay, LLP

(57) ABSTRACT

A plumbing fixture that includes a threaded connection, including a male part having external threads and a female part having internal threads associated with one or more protrusions interspaced such that when the female and male parts mate together, the protrusions on the male part deformably interfere with the protrusion on the threads of the female part to resist loosening of the threaded connection.

17 Claims, 4 Drawing Sheets

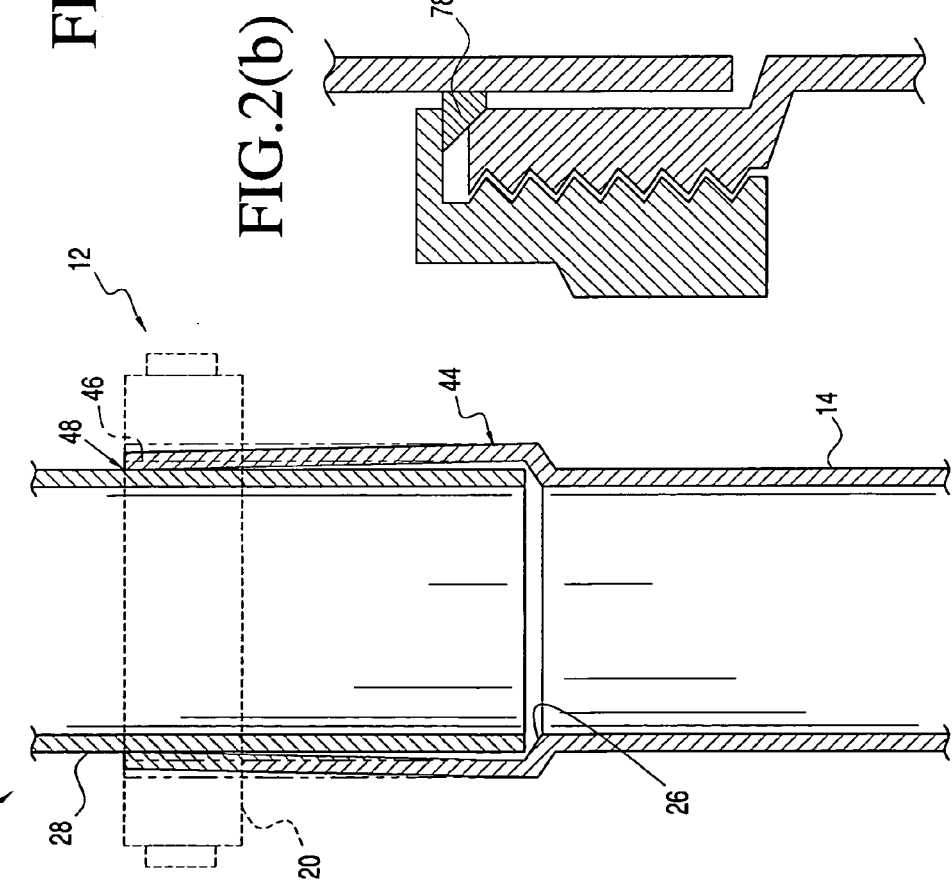
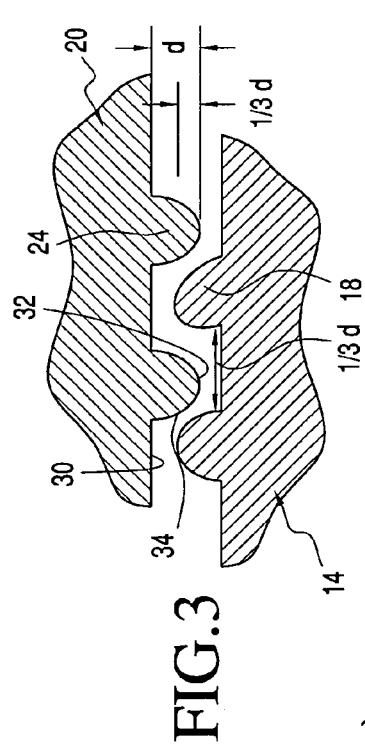
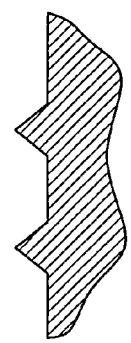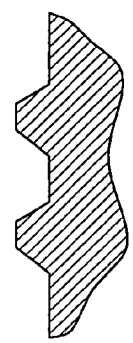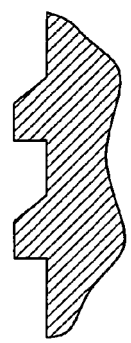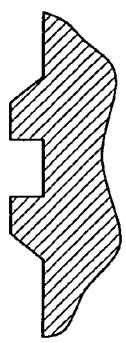

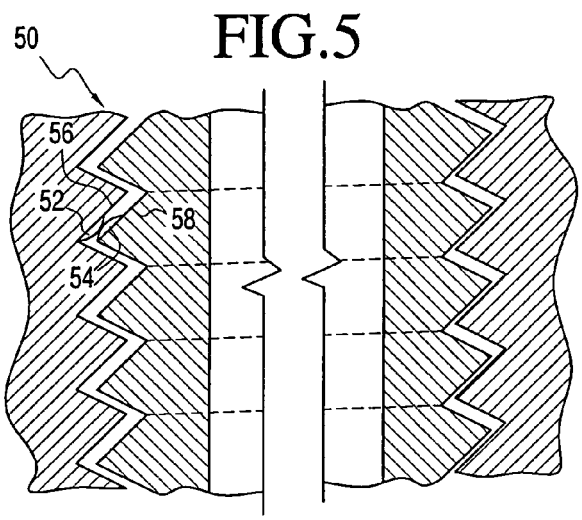
FIG.5
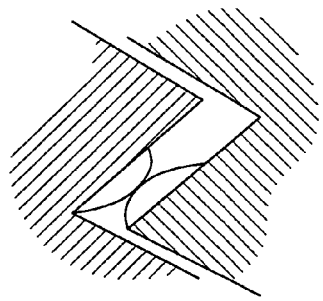
FIG.6
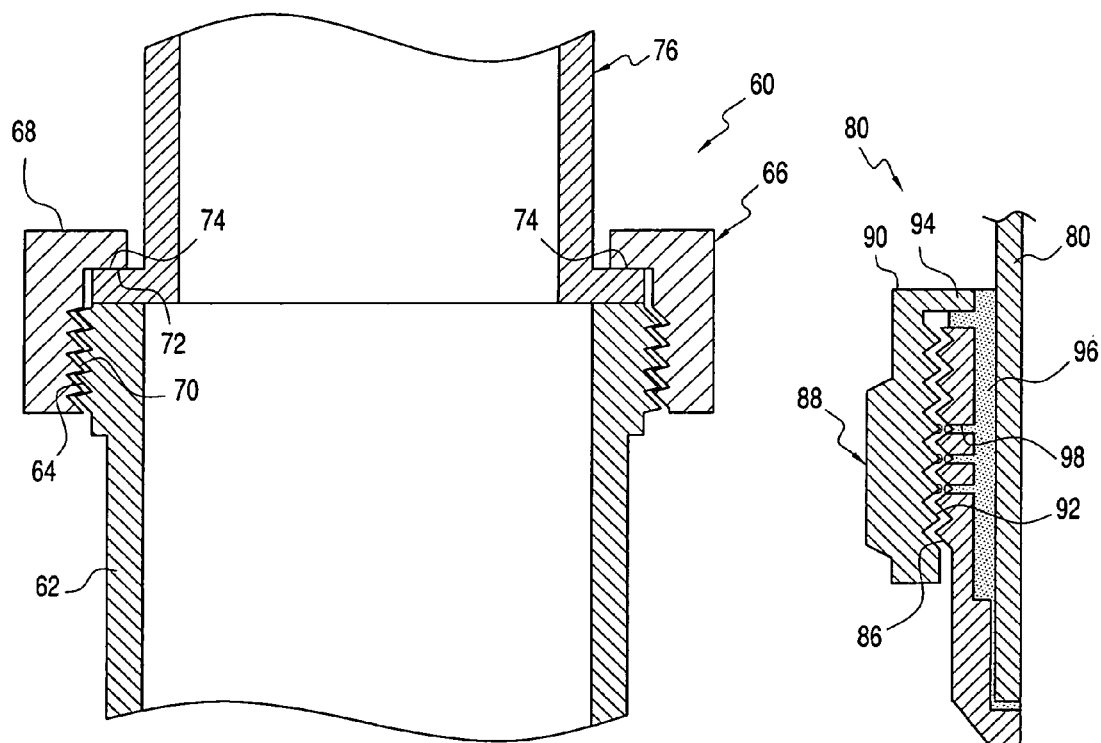
FIG.7
FIG.8

"RESILIENT LOCKING CONNECTION

BACKGROUND OF THE INVENTION

1. Field of the Invention

This invention relates generally to resilient locking connections, and more particularly but not by way of limitation, to locking connections and/or connections to be used either alone, or in combination with plumbing fixtures including but not limited to plumbing pipes.

2. Description of Related Art

Manufacturers have long used various sorts of connections to assure a tight connection that can be undone if necessary, especially in the plumbing industry. Often two pipes are joined together permanently using piping dope or other forms of permanent adhesive that effectively form a plastic "weld". These sorts of connections are quick and easy and do not require the exact tolerances that may be required for the unscrewable connections. A disadvantage of this type of connection is that the connection must be permanently welded in order to prevent fluid leaks. Thus when there is a need to undo the piping in the future the plumbing fixture must be replaced.

Alternatively if a plumbing connection is intended to be unscrewable, it often uses threads to form pressure sealed joints with the use of gaskets, doping materials or other non-permanent fluid sealing agents. These connections often use a top lip to hold one pipe against another pipe often with the help of a gasket. Even when there are in no internal pressures, this connection may make a permeable (non-watertight) seal. If there are any vibrations present, the threaded connection may become loosened allowing leakage. Hence, it is often overtightened in the attempt to make a tight seal, resulting in fractured or broken parts. This alternative has not provided an effective way to connect plumbing fixtures and pipes. Because they are not easily disassembled, they are difficult to install correctly and may be easily over tightened thus preventing the connections from being undone when needed or causing fracturing or breakage of the parts. The following invention overcomes these problems by making a simple connection that will work with a locking nut on two overlapping pipes as well as other types of connections. This invention also makes it very difficult to over tighten a connection such as a plumbing connection that needs to be fastened to a specific tightness.

BRIEF SUMMARY OF THE INVENTION

The present invention includes a threaded connection, including a male part having external threads; and a female part with internal threads and one or more protrusions interspaced such that when the female and male portions are mated together, the protrusions on the male part deformably interfere with the protrusions on the female part to resist loosening of the threaded joint.

BRIEF DESCRIPTION OF THE SEVERAL VIEWS OF THE DRAWING(S)

In the detailed description of the preferred embodiments of the invention presented below, reference is made to the accompanying drawings in which:

FIG. 2a is a cutaway view of a plumbing fixture;

FIG. 2b is a schematic drawing showing a gasket joining a threaded connection;

FIG. 3 is a schematic drawing showing round-shaped protrusions;

FIGS. 4a through 4e are schematic drawings showing other various shaped protrusions;

FIG. 5 is a schematic drawing showing a close up of the protrusions of this invention located on a thread flank;

FIG. 6 is a schematic drawing showing a close-up of the protrusions in a near final position; and FIG. 7 is a schematic showing another embodiment of a resilient locking connection in a plumbing fixture application.

FIG. 8 is a schematic showing another embodiment of a resilient locking connection in a plumbing fixture application.

DETAILED DESCRIPTION OF THE INVENTION

Figure 1:
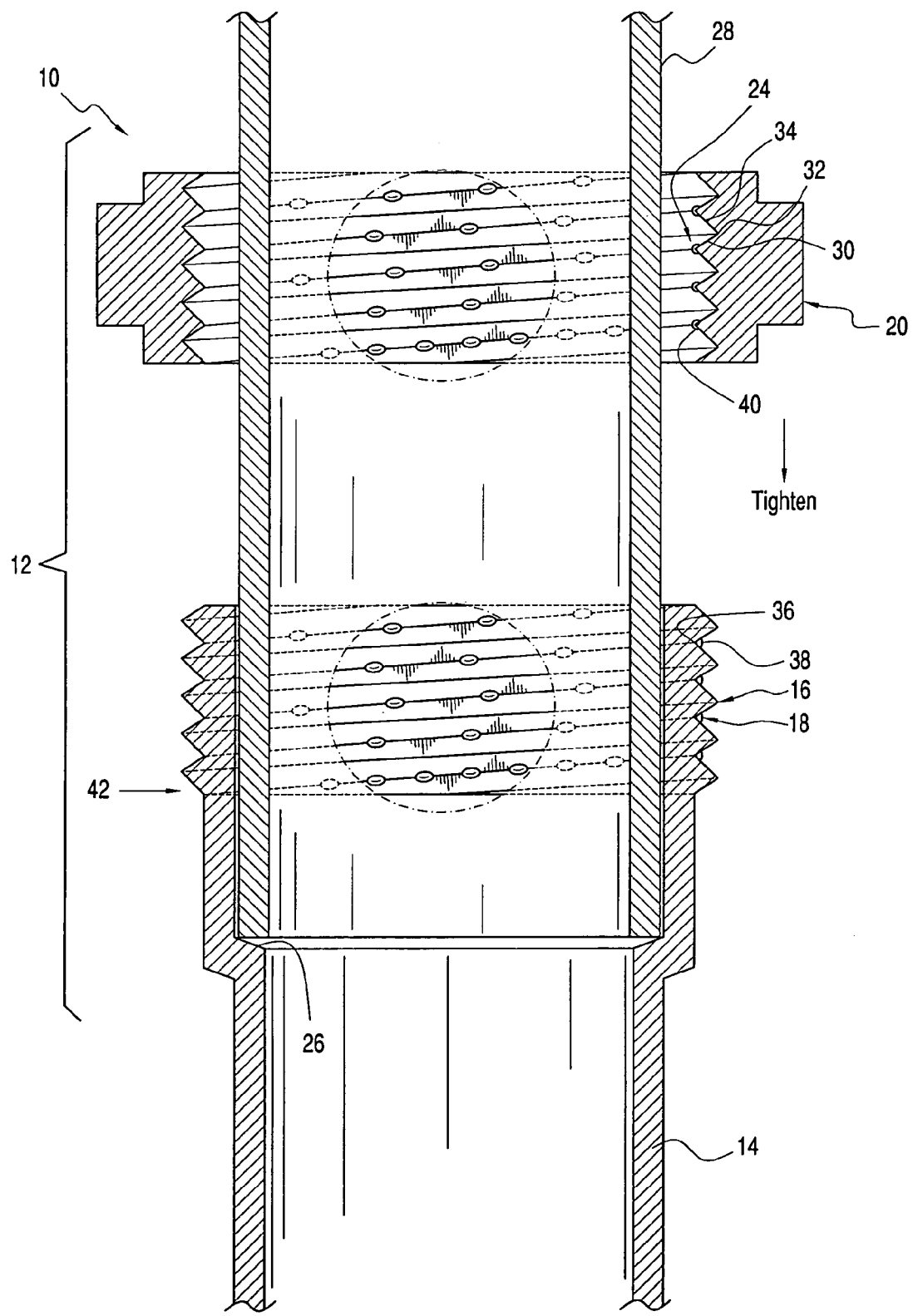
FIG. 1 is a cutaway view of a threaded connection.

FIG. 1 shows a partial cutaway schematic of a threaded connection 10, shown in this case as part of a plumbing fixture, with a resilient locking connection 12 in accordance with one embodiment of the present invention. This embodiment of the threaded connection 10 can be made from a low strength, low hardness plastic, includes a male part, in this case a receiving pipe 14, hereafter referred to as the pipe 14, with external, male threads 16 that include external protrusions 18 as shown in the detailed portion of FIG. 1. The threaded connection 10 also includes a female part, in this case a nut 20, with internal threads 22 that include external protrusions 24 as shown in the detailed portion of FIG. 1. The end of the pipe 14 has a larger internal diameter, allowing the insertion of another pipe or second fixture to form a joint or connection. There is a shoulder 26 where the pipe 14 changes internal diameter that acts as a stop for the inserted second pipe or fixture 28. When tightened, the nut 20 compresses the pipe 14 while a gasket or washer helps to seal the joint or connection.

The threads of the threaded connection 10 each have a root 30, a crest 32, and a flank 34. In this embodiment some male thread roots 36 have protrusions 38 interspaced on matching, opposing protrusions 40 on the female thread crests 32. The protrusions 38 on male thread roots 36 deformably interfere with the protrusions 40 the female thread crests to resist unthreading of the nut 20 from the pipe 14. These opposing protrusions 38, 40 are spaced axially and staggered circumferentially in a set pattern. The pattern may have an increasing number of protrusions on at least one thread circumference such that, as the nut 20 is tightened this high density of protrusions interlocks with a matching high density of protrusions on the female thread crests. Positioning of the high density of protrusions on both the male and female threads allows for the resilient locking connection 12 to be tightened to a specific position 42, as shown on pipe 14 in FIG. 1.

This feature is extremely important with connections such as those used in plumbing fixtures since the connections can be irreversibly damaged if they are over tightened. The materials used are often low tensile strength, in order to make the parts production economical and the user is often an inexperienced user who does not know when he\she has overtightened the connection. This can happen when there are vibrations present that loosen the threaded connection and result in a leakage. Without the protrusions of the present invention, an inexperienced user could easily overtighten the connection in the attempt to make a tight seal, resulting in fractured or broken parts.

The detailed portion of FIG. 1 shows one embodiment where the pattern is such that the threads farthest from the tightened position 42 have only a few protrusions on the threads, shown in this case as two, although there could be more and the threads nearest the tightened position 42 have a higher density of protrusions. This embodiment thus shows an arrangement of higher density of protrusions nearest to tightened position 42 but it could also include a lower destiny of protrusions or even the same density of protrusions as required by the situation and materials in use.

The protrusions depicted in FIG. 1 are located in the roots and on the crests of the applicable threads. It is understood in the art that these protrusions could be on a flank or in any combination of root, crest and/or flank depending upon the character and profile of the thread and the shape of the protrusions being used. It would also be possible to design the protrusion spacing such that the spacing was a high-density spacing on one part and low-density spacing density on the other.

FIG. 2 shows a cutaway view of the threaded connection 10 without the thread details. FIG. 2 more clearly shows how the shoulder 26 of the pipe 14 acts as a stop for a second fixture, such as another threaded pipe 28, or other fixture. When the nut 20 is threaded onto the external portion of pipe 14, as shown, the upper portion 44 of pipe 14 is compressed to position represented by 46 to position represented by line 48, or alternatively, may be compressed by hand until the washer is sufficiently compressed to hold water. FIG. 2b shows an alternate type of threaded connection where the pipe and nut are joined with a gasket-type piece of material 78 acting as a washer to make the connection watertight.

Resiliency is a common factor in most plumbing fixtures because they are composed of a resilient material such as a low hardness plastic, like PVC pipe. In a preferred embodiment the PVC-type plastic is combined with plastic protrusions but it would be clear to one skilled in the art that the same resultant resiliency could be achieved by using metal pipe, such as steel or copper, with nylon or other plastic protrusions or alternatively could involve using some sort of resilient plastic with metal protrusions.

FIG. 3 shows a schematic drawing showing round-shaped protrusions. This enlarged detail shows a very small segment of threaded connection 12. Including the root 30, crest 32 and flank 34 of the representative's threads. The male part 14 is shown with a representative two female part protrusions 18 and the nut 20 is shown with two representative female thread protrusions 24. This schematic shows the opposing protrusions 18, 24 in a near-tightened position 42. FIG. 3 shows how the protrusions start to interact in a resilient manner when they approach the tightened position. The spacing of protrusions helps to retain the connection in the tightened position. In one embodiment the height of the crest d is shown to be inversely related to the spacing between protrusions, which is shown as one-third d in this example.

FIG. 4 shows a variety of protrusions that could be alternatively used. The types shown include round shaped protrusions of FIG. 4a; triangular shaped protrusions of FIG. 4b; trapezoidal protrusions of FIG. 4c; semi trapezoidal protrusion of FIG. 4d; and another protrusion shown in FIG. 4e that would act as a locking thread with one set only being the preferred embodiment since these threads are not symmetrical. Each of these shapes could be used to make a resilient locking connection.

FIG. 5 shows a schematic drawing showing a close up of a threaded plumbing fixture 50 with a pair of opposing protrusions 52, 54 located on two thread flanks 56, 58. In this embodiment as the threads are compressed by the tightening of the nut 20 the opposing protrusions 56, 54 move to contact each other when the threaded connection 12 reaches the tightened position 42. FIG. 6 shows a schematic drawing of a close-up of the opposing protrusions 52, 54 in a near final position. This could occur due to the application of a tightening device such as the nut 20 or could be incorporated with a different type of connection.

FIG. 7 shows another embodiment of a resilient locking connection 60. In this embodiment a lower pipe 62 has external threads 64 that form part of a threaded connection 66 with a connector 68. The connector 68 has internal threads 70 that mesh with threads 64. Connector 68 has a lip 72 that is capable of engaging a corresponding lip 74 of an upper pipe 76. The threaded connection 66 includes the protrusions described above which are not shown in this schematic drawing for simplicity since the protrusions could take many forms. As the connector 68 is tightened, the protrusions move toward each other into a final tightened position as described above.

FIG. 8 shows another embodiment of a resilient locking connection 80. Shown in FIG. 8 are a first pipe 82 and a second pipe 84. In this embodiment pipe 84 has external threads 86 that form part of a threaded connection 88 along with a connector 90. The connector 90 has internal threads 92 that mesh with threads 86. Connector 90 has a lip 94 that is capable of engaging pipe 84. The threaded connection 88 includes protrusions similar to those described above but in this case injecting or adding a material 96 through openings 98 in the second pipe 84 forms protrusions 100.

The material 96 and can be any material including a plastic, metal or other type material that would form the type of seal between the first pipe 80 and the second pipe 84 when connector 88 is tightened. A flexible material such as that used for the gaskets in plumbing fixtures, would work well for making a watertight seal in a plumbing fixture. Such a soft pliable plastic-type material would be easy to inject through the openings 98 shown in FIG. 8. In other instances where a high-pressure seal is desired, soft metal such as titanium or other alloys could be alternatively used for the protrusions 100. When connection 88 is tightened, the protrusions 100 mesh into the threads when a final tightened position is achieved, or alternatively, if there are opposing protrusions than the opposing protrusions move toward each other into a final tightened position as described above.

Figure 9:
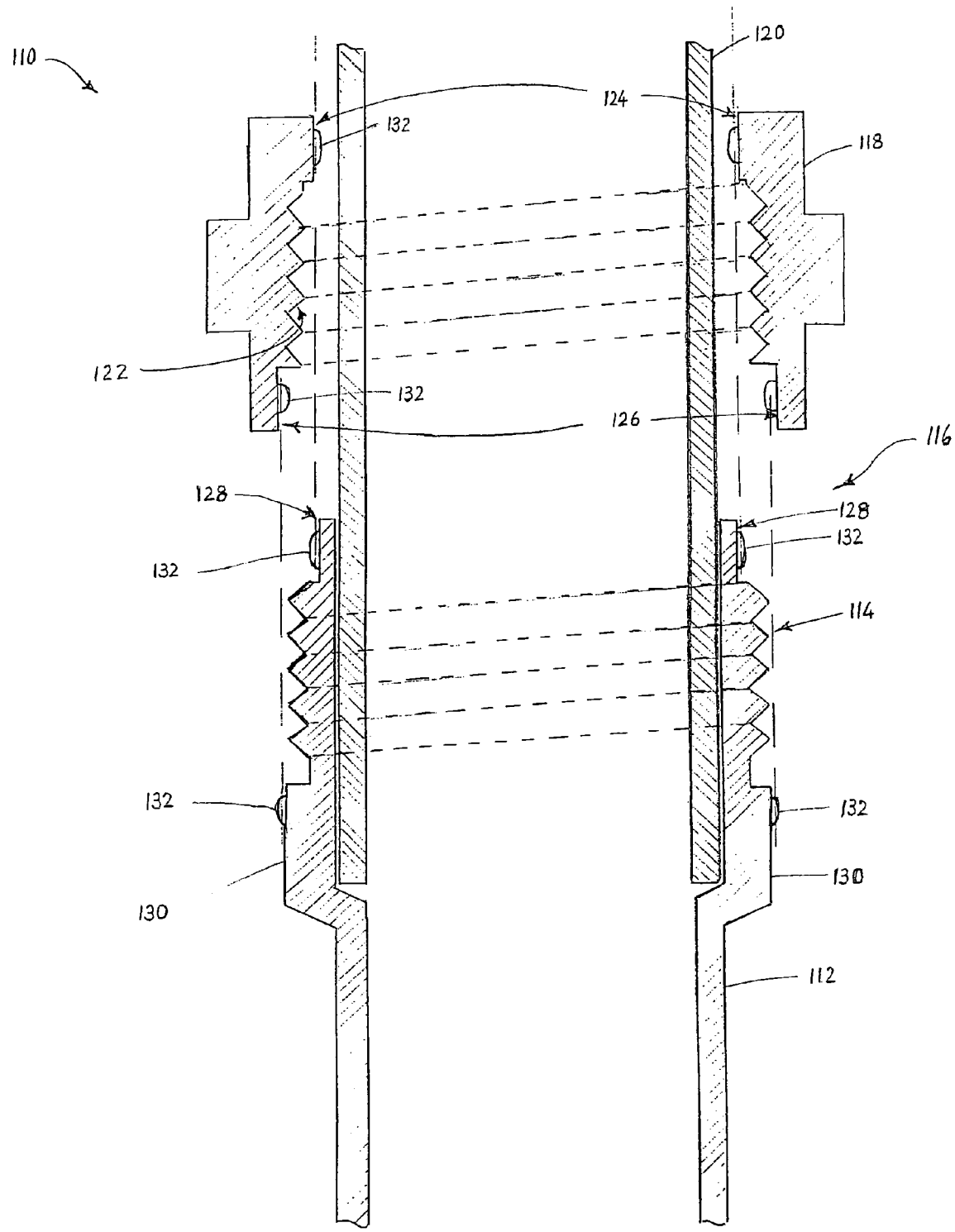
FIG. 9 is a schematic showing another embodiment of a resilient locking connection in a plumbing fixture application.

FIG. 9 shows a partial cutaway schematic of another embodiment of a resilient locking connection 110. In this embodiment a first pipe 112 has external threads 114 that form part of a threaded connection 116 with a connector 118. Also shown in FIG. 9 is a second pipe 120. The connector 118 has internal threads 122 that are capable of meshing with threads 114. Connector 118 has a first lip 124 and a second lip 126 that is capable of engaging a corresponding a first lip 128 and or a second lip 130 of the second pipe 112. The lips shown in FIG. 9 are shown to protrude beyond the thread crests but they could take on other shapes as in known in the art. The threaded connection 116 includes protrusions 132 described above which are only shown schematically in this drawing for simplicity since the protrusions could take many forms.

In this embodiment the protrusions can be on any pair of lips from the pipe and the connector. The protrusions 132 are not placed on the threads 114, 122 in this embodiment although it would be possible to combine this embodiment with those described above if desired. As the connector 118 is tightened, the protrusions move toward each other into a final tightened position. In this embodiment the protrusions could be made in any of the ways described above including by injecting or adding a material to form the protrusions 132. It would also be possible to position the protrusions between the first and second pipes near lip 128 and/or lip 130.

As is well-known in the art there are other threaded connections for plumbing fixtures and for other applications where the incorporation of protrusions as described in this invention would enhance the efficiency of thread interaction, allowing a better connection. There are other applications utilizing protrusions which will prevent over tightening. As described above, this is especially useful when the components are fragile and\or the user inexperienced.

While presently preferred embodiments have been described for purposes of this disclosure, numerous changes may be incorporated. Some indicated above will readily suggest themselves to one skilled in the art, and which are encompassed in the spirit of the invention enclosed, and as defined in the amended claims.

I claim:

1. A threaded connection, wherein each thread has a root, a crest and a flank, comprising:
   (a) a male part comprising a hollow center and external threads having one or more protrusions interspaced on one or more roots of the external threads; and
   (b) a female part comprising internal threads having one or more protrusions interspaced on one or more crests of the internal threads such that when the female and male portions mate together, the protrusions on the threads of the male part deformably interfere with the protrusions on the threads of the female part to resist loosening of the threaded connection.

2. The threaded connection of claim 1 further comprising round-shaped protrusions.

3. The threaded connection of claim 1 further comprising angular-shaped protrusions.

4. The threaded connection of claim 1 further comprising plastic parts with plastic protrusions.

5. The threaded connection of claim 1 further comprising plastic parts with metal protrusions.

6. The threaded connection of claim 1 further comprising metal parts with plastic protrusions.

7. The threaded connection of claim 1 further comprising metal and plastic parts with metal protrusions.

8. The threaded connection of claim 1 further comprising metal and plastic parts with metal and plastic protrusions.

9. A threaded connection, wherein each thread has a root, a crest and a flank, comprising:
   (a) a male part comprising a hollow center and external threads having one or more protrusions interspaced on one or more crests of the external threads; and
   (b) a female part comprising internal threads having one or more protrusions interspaced on one or more roots of the internal threads such that when the female and male portions mate together, the protrusions on the threads of the male part defomably interfere with the protrusions on the threads of the female part to resist loosening of the threaded connection.

10. The threaded connection of claim 9 further comprising round-shaped protrusions.

11. The threaded connection of claim 9 further comprising plastic parts with plastic protrusions.

12. The threaded connection of claim 9 further comprising plastic parts with metal protrusions.

13. The threaded connection of claim 9 further comprising metal and plastic parts with metal protrusions.

14. A threaded connection, wherein each thread has a root, a crest and a flank, comprising:
   (a) a male part comprising a hollow center and external threads having one or more protrusions interspaced; and
   (b) a female part comprising internal threads having one or more protrusions interspaced such that when the female and male portions mate together, the protrusions on the threads of the male part deformably interfere with the protrusions on the threads of the female part to resist loosening of the threaded connection
   wherein opposing protrusions arc spaced axially and staggered circumferentially in a pattern and wherein the number of protrusions of at least one set of protrusions increases nearer the tightened position.

15. The threaded connection of claim 14 further comprising round-shaped protrusions.

16. The threaded connection of claim 14 further comprising plastic parts with plastic protrusions.

17. The threaded connection of claim 14 further comprising plastic parts with metal protrusions.

* * * * *